United States Patent
Chamberlain et al.

(10) Patent No.: US 6,409,808 B1
(45) Date of Patent: Jun. 25, 2002

(54) SEPARATORS

(75) Inventors: Neville Paul Chamberlain, Northampton; Ian Charles Bedwell, Leicestershire, both of (GB); Bjorn Christiansen, Tiller (NO); Gunnar Vangen, Jakosbli (NO); Jan Hoydal, Joerpeland (NO)

(73) Assignee: Kvaerner Process Systems a.s. (NO)

( * ) Notice: Subject to any disclaimer, the term of this patent is extended or adjusted under 35 U.S.C. 154(b) by 0 days.

(21) Appl. No.: 09/554,750

(22) PCT Filed: Nov. 17, 1998

(86) PCT No.: PCT/GB98/03453

§ 371 (c)(1),
(2), (4) Date: Jul. 24, 2000

(87) PCT Pub. No.: WO99/25454

PCT Pub. Date: May 27, 1999

(30) Foreign Application Priority Data

Nov. 18, 1997 (GB) .............................. 9724360
Jan. 21, 1998 (GB) .............................. 9801134
May 9, 1998 (GB) .............................. 9809906

(51) Int. Cl.[7] .............................. B01D 19/00
(52) U.S. Cl. .............................. 96/182; 95/253; 95/261; 96/183; 96/184; 96/208; 210/188
(58) Field of Search .............................. 95/243, 248, 253, 95/259, 261; 96/195, 208, 209, 212, 182, 183, 184; 210/188

(56) References Cited

U.S. PATENT DOCUMENTS

| 2,228,401 | A | * | 1/1941  | Pressler |
| 2,610,697 | A | * | 9/1952  | Lovelady et al. |
| 2,664,963 | A |   | 1/1954  | Lovelady et al. |
| 2,701,620 | A | * | 2/1955  | Crawford |
| 2,706,531 | A |   | 4/1955  | Lovelady et al. |
| 2,750,000 | A | * | 6/1956  | Williams et al. |
| 3,043,072 | A | * | 7/1962  | Walker et al. |
| 3,163,505 | A |   | 12/1964 | Tuck et al. |
| 3,212,232 | A |   | 10/1965 | McMinn |
| 3,396,512 | A | * | 8/1968  | McMinn et al. |
| 4,428,839 | A | * | 1/1984  | Davies et al. |
| 4,539,023 | A | * | 9/1985  | Boley |
| 4,617,031 | A |   | 10/1986 | Suh et al. |
| 4,778,494 | A | * | 10/1988 | Patterson |
| 5,064,448 | A |   | 11/1991 | Choi |
| 5,500,039 | A | * | 3/1996  | Mori et al. |
| 5,522,999 | A |   | 6/1996  | Broussard |
| 5,900,137 | A | * | 5/1999  | Homan |
| 5,928,519 | A | * | 7/1999  | Homan |

FOREIGN PATENT DOCUMENTS

| DE | 35 31 016 A1 | 3/1987 |
| EP | 0 018 168 A2 | 10/1980 |
| EP | 0 024 148 A1 | 2/1981 |
| WO | 89/02785     | 4/1989 |

* cited by examiner

Primary Examiner—Duane S. Smith
(74) Attorney, Agent, or Firm—Cesari and McKenna, LLP

(57) ABSTRACT

A gravity separator including a vessel within which a mixture containing oil and water can separate under gravity to form vertically discrete oil and water layers, the vessel having an inlet assembly including a cyclone separator for separating an oil-containing inlet flow into gas and liquid phases, that assembly including ducting for receiving the underflow of cyclone separator and conducting that underflow into that region of the vessel which, in use, is above the water layer.

18 Claims, 9 Drawing Sheets

SEPARATORS

BACKGROUND OF THE INVENTION

This invention relates to gravity separators, primarily of the kind in which mixed gas, oil and water in a production flow from an oil well are separated by gravity into discrete, vertically spaced, gas, oil and water layers in a separator vessel for subsequent extraction from the vessel by way of a respective gas outlet, oil outlet and water outlet.

It is known to supply the inlet mixture to a gravity separator vessel by way of a gas/liquid cyclone separator which performs a preliminary separation of the inlet mixture into a gas phase and a liquid phase, the liquid phase from the cyclone being discharged into the lower region of the gravity separation vessel, by way of an anti-swirl arrangement.

SUMMARY OF THE INVENTION

It is an object of the present invention to improve, in a simple and convenient manner, the separation efficiency of a gravity separator of the kind having a gas/liquid cyclone inlet arrangement.

In accordance with a first aspect of the present invention there is provided a gravity separator comprising a vessel within which a mixture containing oil and water can separate under gravity to form vertically discrete oil and water layers, the vessel having an inlet assembly including a cyclone separator for separating an oil containing inlet flow into gas and liquid phases, said assembly including ducting for receiving the underflow of the cyclone separator and conducting said underflow into that region of the vessel which, in use, is above the water layer.

Preferably the cyclone separator is housed within said vessel and said ducting ensures that the underflow of the cyclone separator is discharged into said region above the water layer even though the underflow outlet of the cyclone separator may be below within the region of the vessel occupied in use by said water layer.

Conveniently the cyclone separator has its overflow outlet within the region of said vessel occupied in use by a gas layer above said oil layer.

Alternatively said cyclone separator is positioned externally of said vessel, said ducting extending through the wall of said vessel to discharge the underflow into said region above the water layer.

In accordance with a second aspect of the present invention there is provided a gravity separator comprising a vessel within which a mixture containing oil and water can separate under gravity to form vertically discrete oil and water layers, the vessel having an inlet assembly including a cyclone separator for separating an oil containing inlet flow into gas and liquid phases, said cyclone separator being positioned inside said vessel with its longitudinal axis inclined out of the vertical by an angle such that It. the underflow outlet of the cyclone separator lies above the region of said vessel occupied by said water layer in use.

Preferably said vessel is intended to accommodate vertically discrete water, oil, and gas layers, and the angle of inclination of the cyclone axis is such, in relation to the length of the cyclone separator, that the overflow outlet of the separator lies in that region of the vessel occupied by the gas layer in use.

Desirably said cyclone separator is arranged with its longitudinal axis in a plane normal to the longitudinal axis of said vessel.

Alternatively said cyclone separator is positioned with its longitudinal axis in a plane containing, or parallel to, the longitudinal axis of said vessel.

In accordance with a third aspect of the present invention there is provided a gravity separator comprising a vessel within which a mixture containing oil and gas can separate under gravity to form vertically discrete oil and gas layers, the vessel having an inlet assembly including a cyclone separator for separating an inlet flow containing oil and gas into gas and liquid phases, and the assembly being arranged to discharge the underflow of the cyclone separator into that region of said vessel which is adjacent the interface of the oil and gas layers in use.

Preferably there is provided ducting for receiving the underflow of the cyclone separator and conducting said underflow into said region of the vessel.

Alternatively said cyclone separator is positioned within said vessel with its longitudinal axis inclined out of the vertical by an angle such that the underflow outlet of the cyclone separator lies in said region of said vessel.

Conveniently the overflow outlet of the cyclone separator discharges externally of the vessel.

Preferably the height within the vessel at which the underflow of the cyclone separator is discharged into the vessel can be adjusted.

Preferably means is provided for dissipating swirl in the underflow prior to its discharge into the vessel.

Conveniently the inlet assembly includes a plurality of cyclone separators.

In accordance with a further aspect of the present invention there is provided a gravity separator comprising a vessel within which a mixture containing oil and water can separate under gravity to form vertically discrete oil and water layers, the vessel having an inlet assembly including a cyclone separator for separating an oil containing inlet flow into gas and liquid phases, the selection of the vessel diameter and the height of the oil/water interface in the vessel, in relation to the positioning and axial length of the cyclone separator, is such that with the cyclone separator positioned generally normal to the plane of the oil/water interface, the underflow outlet of the cyclone separator can discharge directly into that region of the vessel which, in use, is above the water layer in the vessel.

Desirably the discharge of the underflow of the cyclone separator takes place by way of an anti-swirl device.

In accordance with a further aspect of the invention there is provided a inlet assembly for a gravity separator comprising a cyclone separator having a underflow outlet ducting arrangement for discharging the underflow at a region aligned with a position intermediate the axial ends of the cyclone separator.

DETAILED DESCRIPTION OF THE INVENTION

Figure 1:
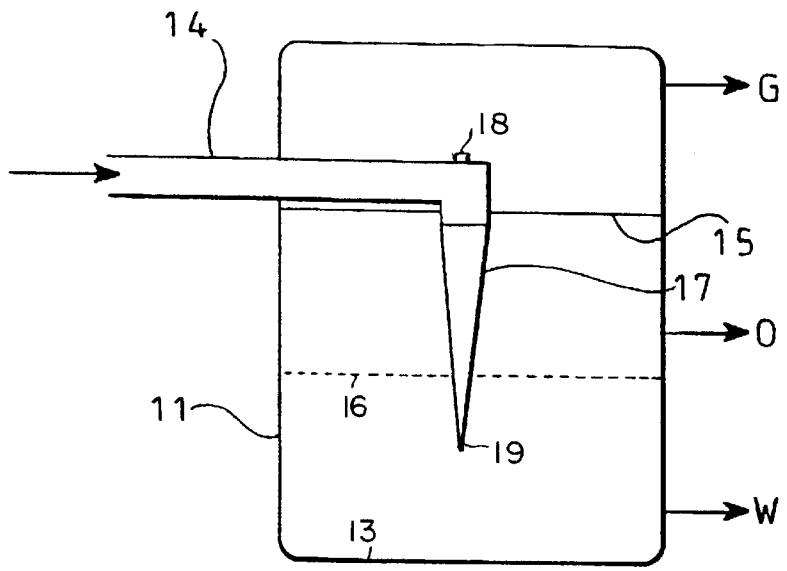
FIGS. 1, 2 and 3 are diagrammatic representations of known gravity separator arrangements.

Referring first to FIG. 1 of the accompanying drawings, the known gravity separator includes a separation vessel 11 incorporating an inlet assembly 14 through which a production flow from an oil well is introduced into the separator 11. The production flow contains gas, oil and water, which can separate under gravity in the vessel into vertically discrete gas, oil and water layers, and the vessel has three separate, vertically spaced outlets "G", "a" and "W" for receiving gas, oil and water respectively from said layers in the separation vessel 11. As will be understood by those skilled in the art the size of the vessel 11 is chosen in relation to the flow rate of material through the vessel, to provide sufficient residence time within the vessel 11 for separation of the production flow, under gravity, into discrete gas, oil and water layers the depths of which remain constant in steady state conditions.

The inlet assembly 14 includes a gas/liquid cyclone separator 17 for separating the production flow into gas and liquid phases. The gas is discharged from the overflow (reject) outlet 18 the cyclone separator into the upper region of the vessel, within the area occupied by the gas layer in use, while the liquid phase from the underflow outlet of the cyclone is discharged through an underflow outlet 19 into the lower region of the vessel, within the region occupied by the water layer in use. It is known that the use of such a cyclone inlet assembly improves the efficiency of a gravity separator by pre-separating a proportion of the gas phase and by minimising foaming of the inlet flow which can otherwise occur.

Figure 2:
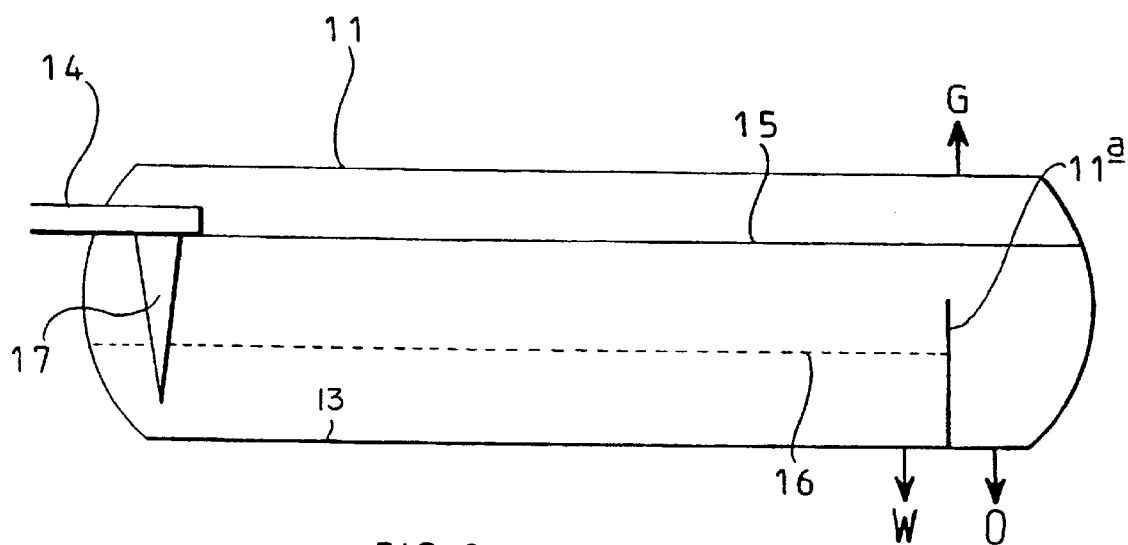
Figure 3:
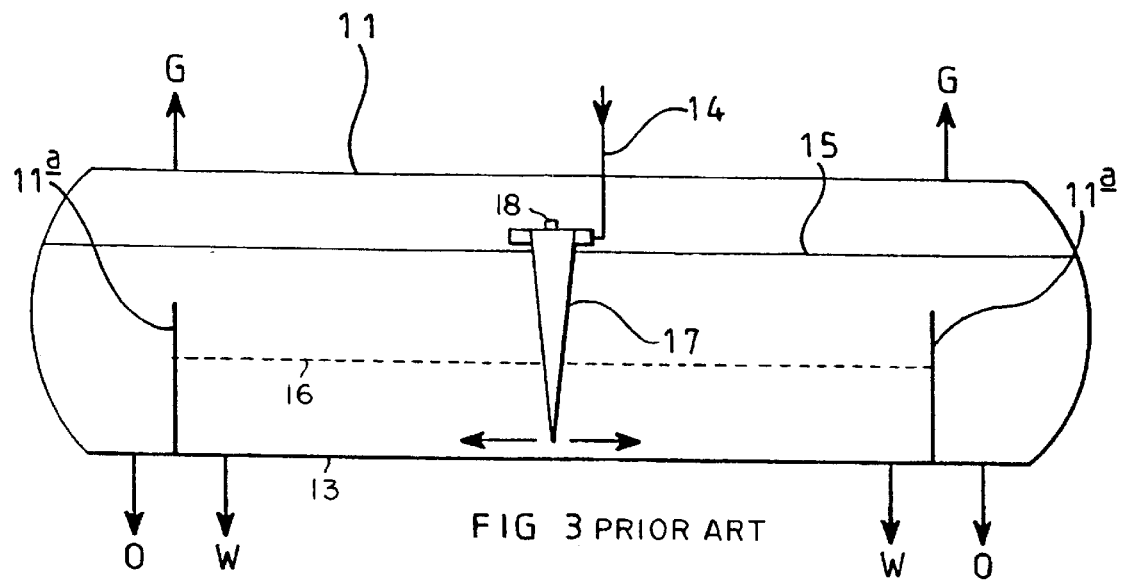

In FIG. 1 the flow through the vessel can be thought of as a vertical flow. FIG. 2 illustrates an alternative in which the vessel 11 is elongate and the inlet assembly 14 is disposed close to one end of the vessel so that the flow is generally horizontal within the vessel from the inlet assembly 14 to outlets "G", "a" and "W" at the opposite end of the vessel. A weir 11 a adjacent the outlet end of the vessel provides an end to the water layer and so permits both oil and water outlets to be in the bottom wall 13 of the vessel 11. FIG. 3 illustrates a modification of the FIG. 2 arrangement in which the inlet assembly 14 is disposed midway along the length of the vessel so that the flow is generally horizontal within the vessel from the inlet assembly to outlets "G", "O" and "W" at both ends of the vessel. Separation under gravity takes place on both sides of the assembly 14 so that the vessel is in effect two separators back-to-back. The assembly 14 can, if desired, feed two parallel cyclone separators each serving a respective set of outlets. Weirs 11 a adjacent each end of the vessel provide ends to the water layer and so permit both oil and water outlets to be in the bottom wall 13 of the vessel 11.

Figure 4:
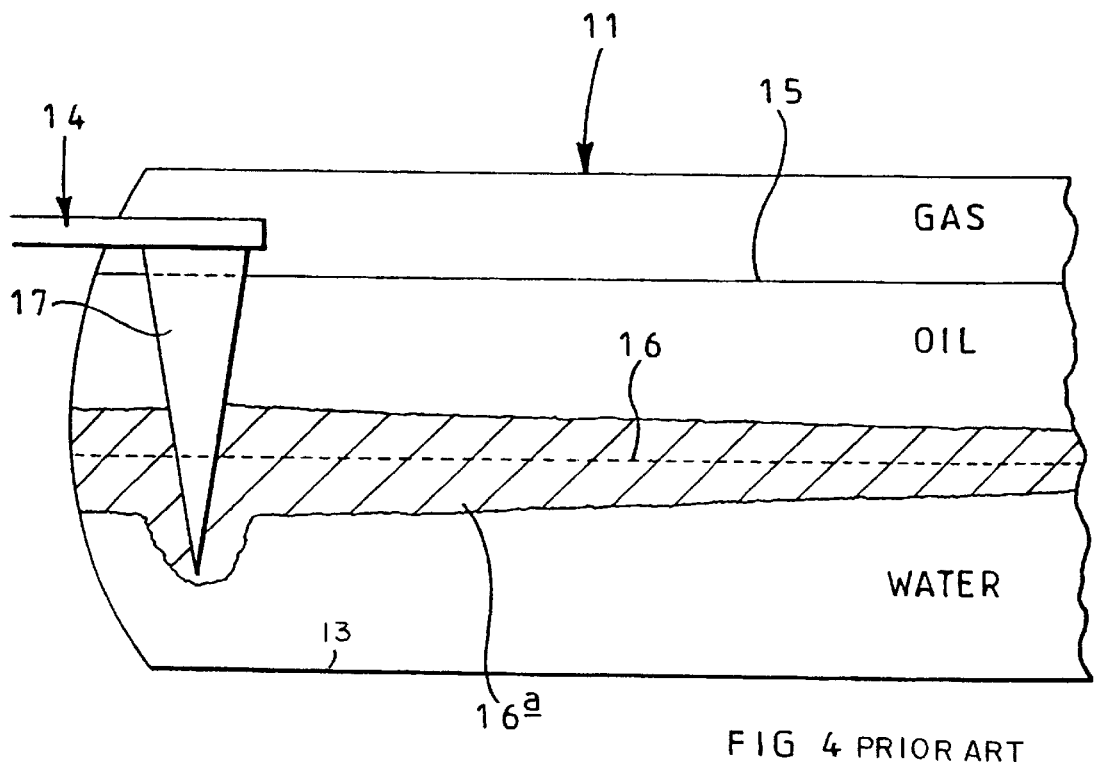
FIG. 4 is an enlargement of part of FIG. 2.

In FIGS. 1 to 3 the solid line 15 illustrates the location of the gas/oil interface within the vessel 11 during operation of the gravity separator within the range of its design parameters. Similarly the dotted line 16 illustrates the position of the oil/water interface. However it is simplistic in many applications to think solely in terms of gas, oil and water layers since for most well-stream compositions the discharge of the well-stream into the vessel 11 will generate a dispersion layer between a "clean" water layer and a "clean" oil layer. The dispersion layer is an oil/water emulsion which to a large extent dissipates, separating into oil and water, during its residence time in the vessel. FIG. 4 is an enlargement of part of FIG. 2 showing the dispersion layer 16g and indicating that its thickness diminishes from a maximum adjacent the inlet assembly 14.

It is usual to position the gas/liquid cyclone 17 of the inlet assembly 14 with its longitudinal axis extending vertically, and thus normal to the interface planes 15, 16. The overall axial length of the cyclone 17 is such that the overflow outlet 18 of the cyclone extends above the interface 15 into the gas layer within the vessel 11 while the liquid phase underflow outlet is in the water layer below the interface 16.

Figure 5:
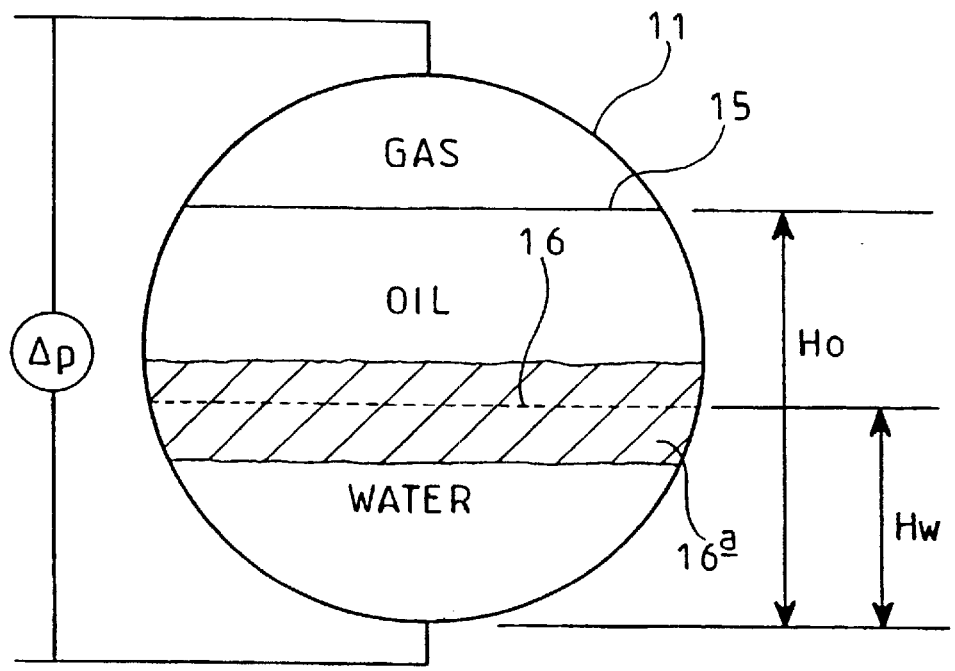
FIG. 5 is a cross section of FIG. 4 adjacent the outlet end of the vessel, illustrating how a notional oil/water interface may be determined.

Referring to FIG. 5, in the vessel 11, the oil/water interface 16 shown by the dotted line in the drawings does not normally exist as a true oil/water interface throughout most of the length of the vessel 11 owing to the presence of the dispersion layer 16a. However a notional height $H_w$ for the interface 16 above the lowest point in the vessel 11 can be calculated as follows:

$$H_w = \frac{1}{\rho_w - \rho_o}\left(\frac{\Delta P}{g}\right) - H_o(\rho_o - \rho_g) + D\rho_g$$

where $\rho_w$ is the density of water, $\rho_o$ is the density of the oil, $\rho_g$ is the density of the gas, D is the diameter of the vessel 11, g is gravity (9.81 m/s$^2$), $H_o$ is the height of the oil/gas interface 15 above the lowest point of the vessel 11, and $\Delta P$ is the pressure difference between the top and bottom of the vessel 11. References herein to the oil/water interface should therefore be construed accordingly.

In accordance with the present invention it is essential to discharge the liquid phase from the cyclone 17 into the vessel 11 above the water layer, that is to say into the region of the vessel 11 between the gas/oil interface 15 and the interface of the water layer and the dispersion layer. Most desirably the discharge will take place above the oil/water interface 16 and preferably will take place into the oil layer itself.

Figure 6:
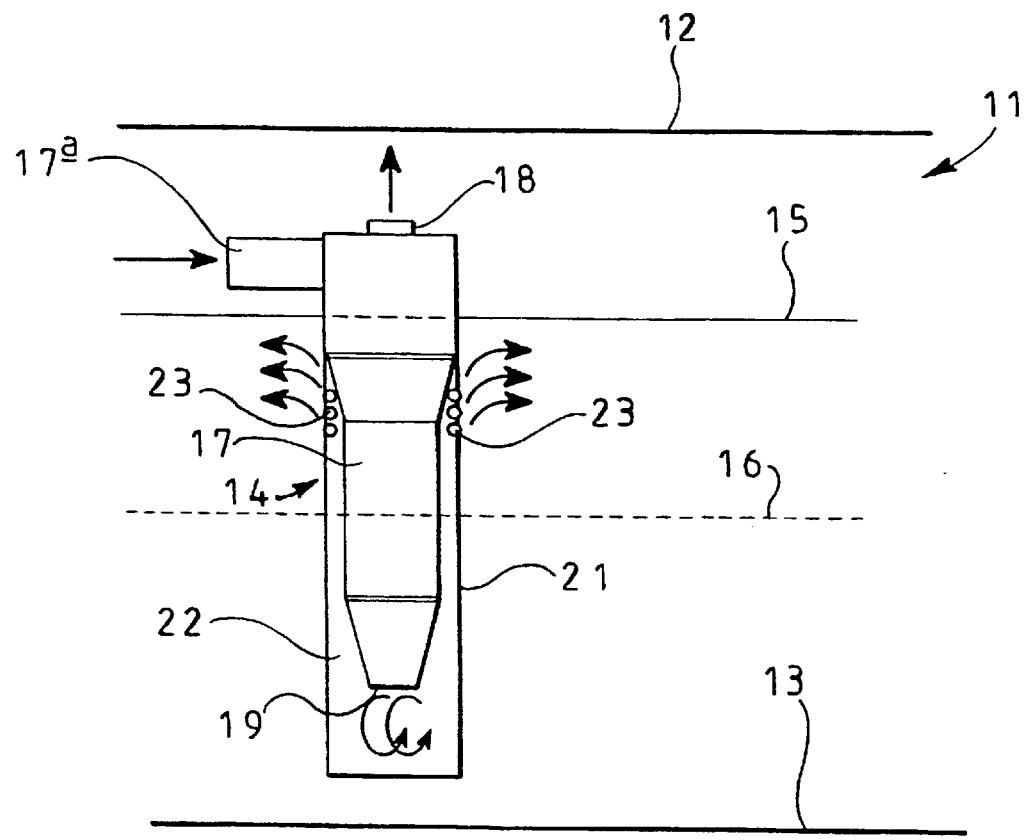
FIG. 6 is a diagrammatic cross-sectional view of a gravity separator in accordance with one example of the present invention.

In the example of the invention illustrated in FIG. 6, the cyclone 17 is disposed within a coaxial, cylindrical housing 21 which defines an outlet chamber 22 into which the liquid underflow of the cyclone is discharged. The housing 21 is closed except for a plurality of circumferentially spaced outlet apertures 23 in that region of the length of the housing 21 adjacent the nominal median plane of the oil layer in the vessel 11 in normal use. Thus the gas separated by the cyclone 17 from the wellhead flow is discharged via apertures 23 into the gas layer of the vessel 11, and the liquid remainder is discharged into the oil layer. Furthermore, although the flow issuing from the underflow outlet 19 will still have considerable swirl energy, the turbulence and swirling of the liquid issuing from the outlet 19 will be dissipated within the chamber 22 so that a quiescent flow issues from the multiple apertures 23 into the oil layer and thus generates little or no turbulence so obviating mixing of the previously separated oil, gas and water within the vessel.

The discharge of the oil/water mixture from the apertures 23 into the oil layer promotes a much more rapid and efficient separation of the oil and water than is found to be the case if the oil/water mixture is discharged from the cyclone 17 directly into the water layer or adjacent the water/dispersion interface of the gravity separator. Prior to the present invention the conventional view was that discharge of the liquid phase of the well-stream into the water layer was the appropriate arrangement for achieving efficient separation. A surprising improvement in separation is achieved by discharging the cyclone underflow mixture of water droplets dispersed in an oil phase into the oil layer of the gravity separator.

It will be recognised that in the construction illustrated in FIG. 6 vanes or baffles can be disposed within the chamber 22, preferably within the annular region of the chamber between the inner wall of the housing 21 and the outer wall of the cyclone 17, to ensure that all swirl and turbulence of the liquid phase is dissipated before the liquid phase is discharged through the apertures 23 into the oil layer of the vessel 11.

Figure 7:
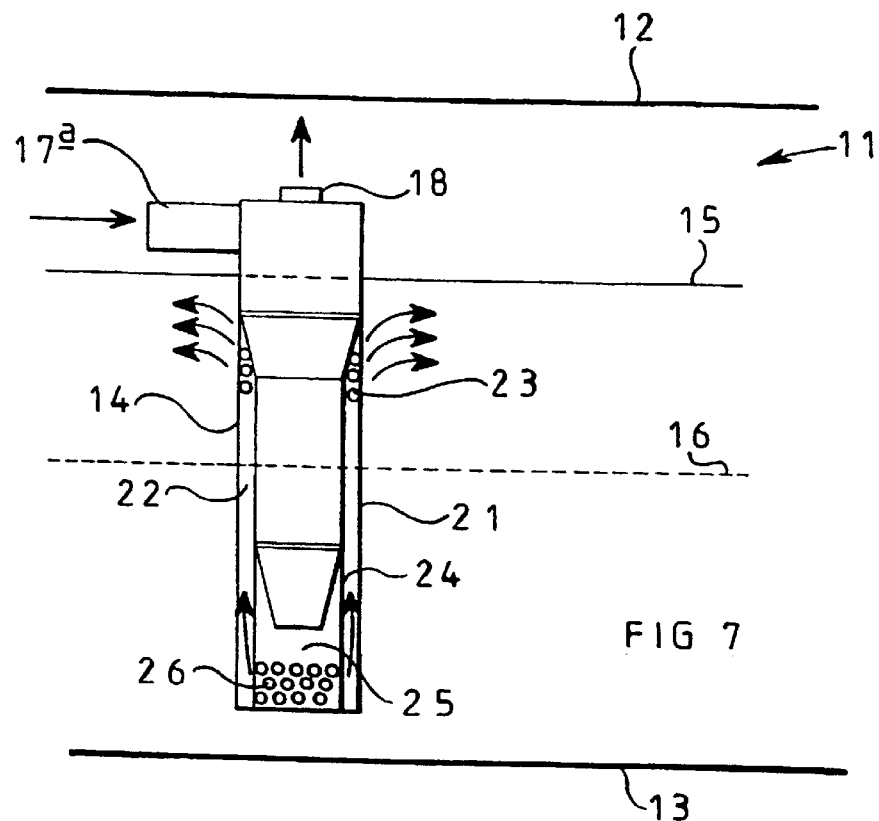
FIG. 7 is a view similar to FIG. 6 illustrating a first alternative.

In the modification illustrated in FIG. 7 an anti-swirl device 24 is attached to the underflow end of the cyclone 17 to define a sub-chamber 25 into which the underflow is discharged. The sub-chamber 25 is defined by a cylindrical casing within the casing 21 and having a plurality of apertures 26 through which the underflow liquid percolates into the annular chamber 22. Thereafter the oilwater underflow of the cyclone percolates through the apertures 23 into the oil layer of the vessel 11.

In both FIG. 6 and FIG. 7 the inlet mixture for the gravity separator 11 is a production flow from an oil well and contains gas, oil and water and is piped through a side region or end region of the wall of the vessel 11 directly into the inlet 17a of the cyclone 17. The flow may already have been treated to remove sand or other solid inclusions if necessary, but for many production flows such de-sanding is unnecessary. Thus the inlet flow is not discharged freely into the vessel 11 and instead passes through the cyclone for preliminary cyclonic separation into the gas and liquid phases. It is to be understood however that dissolved gas from the liquid phase may continue to separate after the liquid phase is discharged from the apertures 23 into the oil layer, and any gas bubbles forming within the oil layer will migrate upwardly to join the gas layer through normal gravity separation. For this reason it is desirable to discharge the underflow of the cyclone within the oil layer as close to the oil/gas interface as possible. If desired, for example to increase the inlet flow rate, there may be duplicate cyclone separators 17 parallel to one another in the vessel.

Figure 8:
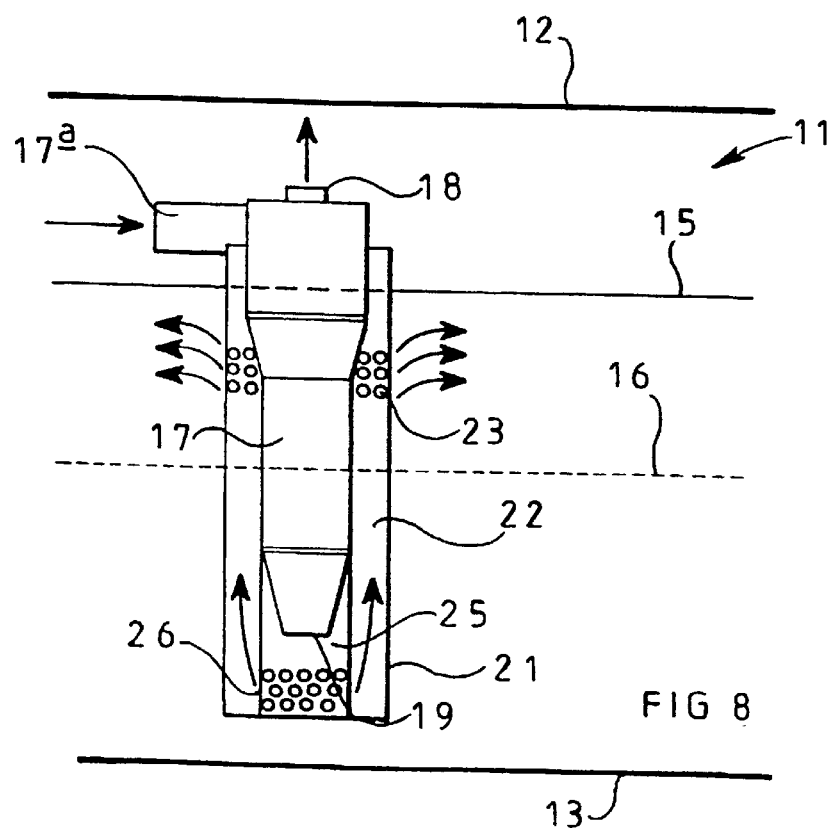
FIG. 8 is a view similar to FIG. 6 of the gravity separator in accordance with a second example of the present invention.
Figure 9:
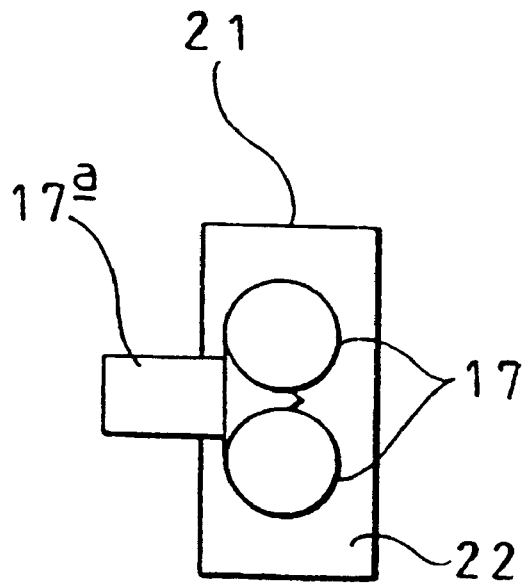
FIG. 9 is a diagrammatic transverse cross-sectional view of the inlet arrangement of the separator illustrated in FIG. 8.

In the example of the invention illustrated in FIGS. 8 and 9 the construction is very similar to that described above in relation to FIG. 7 except in that the housing 21 is of larger volume. As illustrated in FIG. 9, the housing 21 is of rectangular cross-section although the actual shape is not of importance. The housing 21 houses two cyclone separators 17 fed from a common inlet 17a both cyclone separators 17 discharging through anti-swirl arrangements into the enlarged chamber 22. The combined liquid underflows then percolate through the apertures 23 into the oil layer within the vessel 11.

In FIGS. 6 and 7 the housing 21 is closed at its upper end by engagement with the outer surface of the inlet region of the cyclone 17. As illustrated in FIG. 8 the enlarged housing 21 can, if desired, be open at its upper end, within the gas layer in the vessel 11, so that any gas separating from the liquid phase within the chamber 22 can issue from the upper end of the housing 21 directly into the gas layer within the vessel. It will be recognised that in some situations the anti-swirl housing 24 attached to the lower end of each of the cyclones 17 may not be necessary, and can be dispensed with. Similarly, vanes and/or baffles can be positioned within the chamber 22 as an alternative, or additional means of dissipating swirling and turbulence within the chamber 22 in advance of the liquid phase percolating through the apertures 23 into the oil layer.

Figure 10:
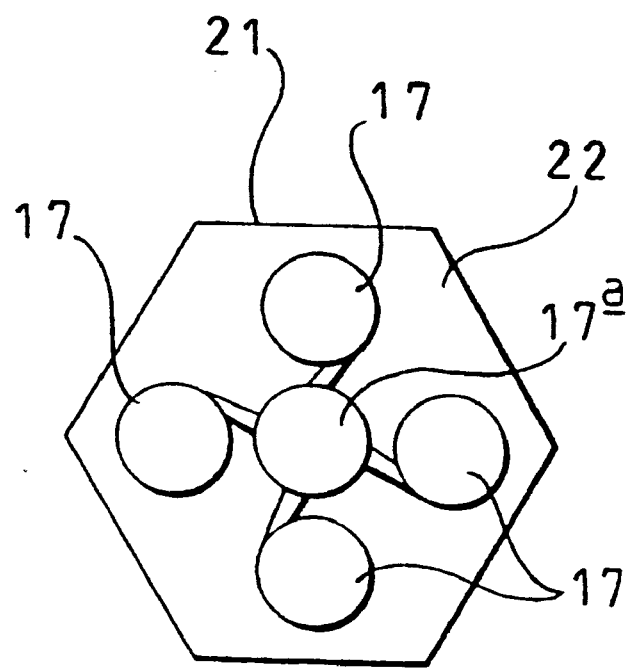
FIG. 10 is a view similar to FIG. 9 of a modification.

FIG. 10 illustrates that by appropriate shaping of the housing 21 a chamber 22 can be provided to receive the liquid underflow from a greater number of cyclone separators 17. The cyclone separators 17 can be supplied from a common inlet 17a or from separate inlets if desired, and such configurations are well suited to use in a "vertical" separator of the kindshown diagrammatically in FIG. 1. Similarly a plurality of cyclone separator arrangements as shown in FIGS. 6 and 7 could be positioned with their axes parallel around a common inlet pipe which feeds the inlets of all of the cyclones and which in turn discharge their underflows into the oil layer.

Figure 11:
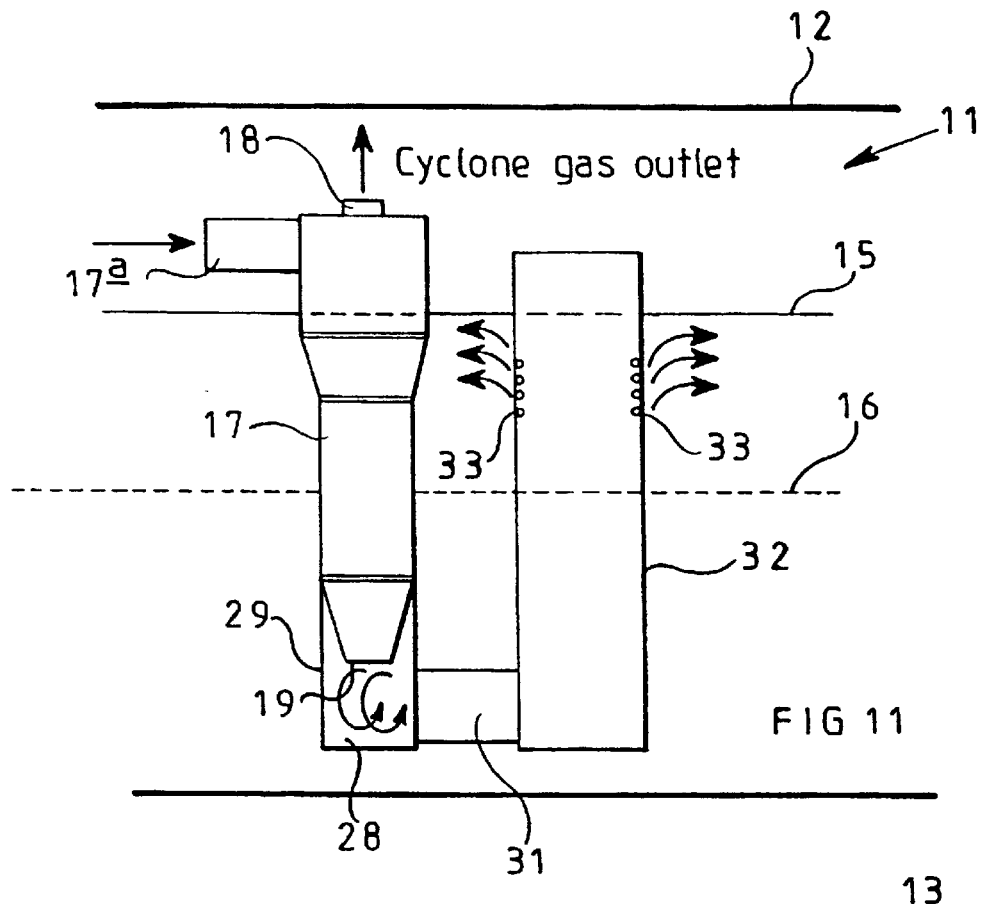
FIG. 11 is a view similar to FIG. 6 of a gravity separator in accordance with a third example of the present invention.

It will be recognised that in all of the examples and modifications described above the cyclone underflow outlet is physically below the oil/water interface 16, and the liquid underflow from the cyclone is ducted vertically around the outside of the cyclone within a housing 21 so as to be discharged into the oil layer FIG. 11 illustrates an example of the invention in which remote ducting is utilized. The cyclone 17 has an underflow outlet chamber 28 at its lower end, the chamber 28 being defined by a cylindrical housing 29 similar to the housing 24 of FIGS. 7 and 8, but without the circumferentially disposed outlet apertures 26. The housing 29 has a single outlet port through which the liquid underflow passes into a horizontally extending outlet duct 31 lying in the water layer region of the vessel 11. At its end remote from the housing 29 the duct 31 discharges into the lower end of a cylindrical, vertically disposed outlet stack 32. The outlet stack 32 is in effect a vertically disposed pipe of circular cross-section (although its shape is not critical) the axial length of which is such that it extends upwardly from adjacent the wall 13, through the water layer, and at least into the oil layer. Within the oil layer, between the interfaces 15, 16, the wall of the outlet stack is perforated, having a plurality of circumferentially disposed apertures 33 through. which the liquid discharged from the underflow outlet 19 of the cyclone 17 percolates into the oil layer within the vessel 11.

If desired the stack 32 can be of sufficient axial length to extend upwardly into the gas layer, and can have porting at its upper end whereby gas which separates from solution within the stack 32 can pass directly into the gas layer 11.

Figure 12:
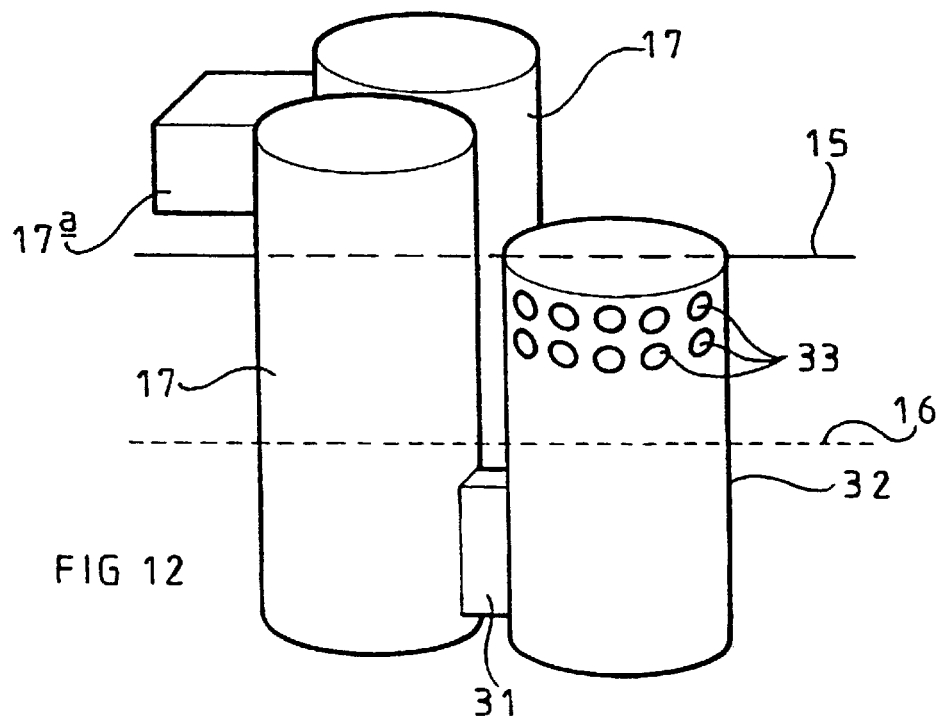
FIG. 12 is a diagrammatic perspective view of a modification of the inlet assembly illustrated in FIG. 11.

FIG. 12 illustrates that a plurality of cyclones 17 can discharge their liquid underflows through a common, or respective ducts 31 into a common outlet stack 32. Two cyclones are illustrated in FIG. 12, both being supplied from a common inlet assembly 17a.

It will be recognised that in most instances the duct 31 and stack 32 are sufficient to dissipate turbulence and swirl in the liquid issuing from the cyclone underflow outlets 19. However, if necessary anti-swirl devices in the form of perforated housings, baffles, vanes or the like can be incorporated to ensure that the liquid flow issuing through the apertures 33 of the stack 32, into the oil layer, is a quiescent flow.

Figure 13:
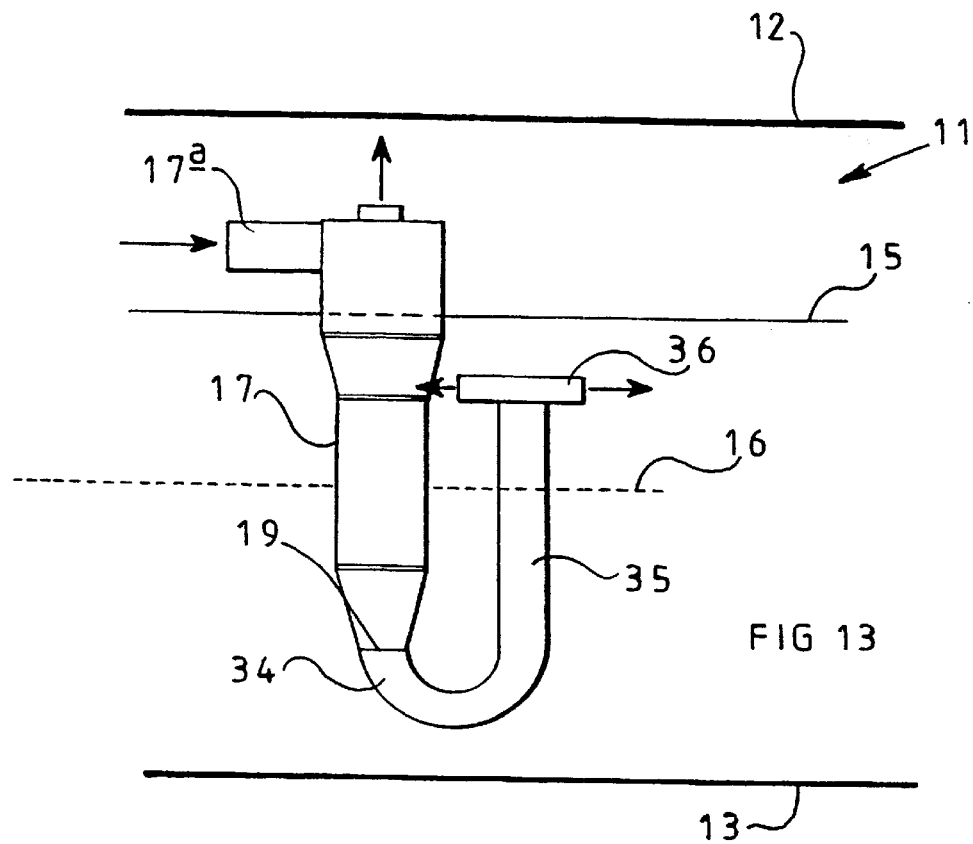
FIG. 13 is a view similar to FIG. 6 of a gravity separator in accordance with a fourth example of the present invention.

FIG. 13 illustrates a further example of the invention quite similar to the FIG. 11 example. In FIG. 13 it can be seen that each cyclone underflow outlet 19 has an individual ducting 34 to an individual vertically extending outlet pipe 35. The outlet pipe 35, as with the stack 32 of FIG. 11, has its longitudinal axis vertical, parallel to the axis of each respective cyclone or cyclones, and spaced therefrom. The ducting 34 thus constitutes a U-shaped extension of the outlet pipe 35, and may be integral therewith. The outlet pipe 35 of the cyclone extends upwardly from the water layer region of the vessel 11 into the oil layer region and has a discharge assembly 36 at its end. The discharge assembly 36 is arranged to dissipate swirl and turbulence within the underflow from the cyclone 17 to ensure that the liquid is discharged into the oil layer in a quiescent manner. It will be recognised that by comparison with the arrangement illustrated in FIGS. 11 and 12 the ducting 34 and pipe 35 alone would not necessarily dissipate swirl and turbulence in the underflow from the cyclone 17. Thus the discharge assembly 36 will have an internal arrangement of vanes and/or baffles for controlling the liquid flow and dissipating its swirl and turbulence before it issues from the assembly 36 into the oil layer.

Figure 14:
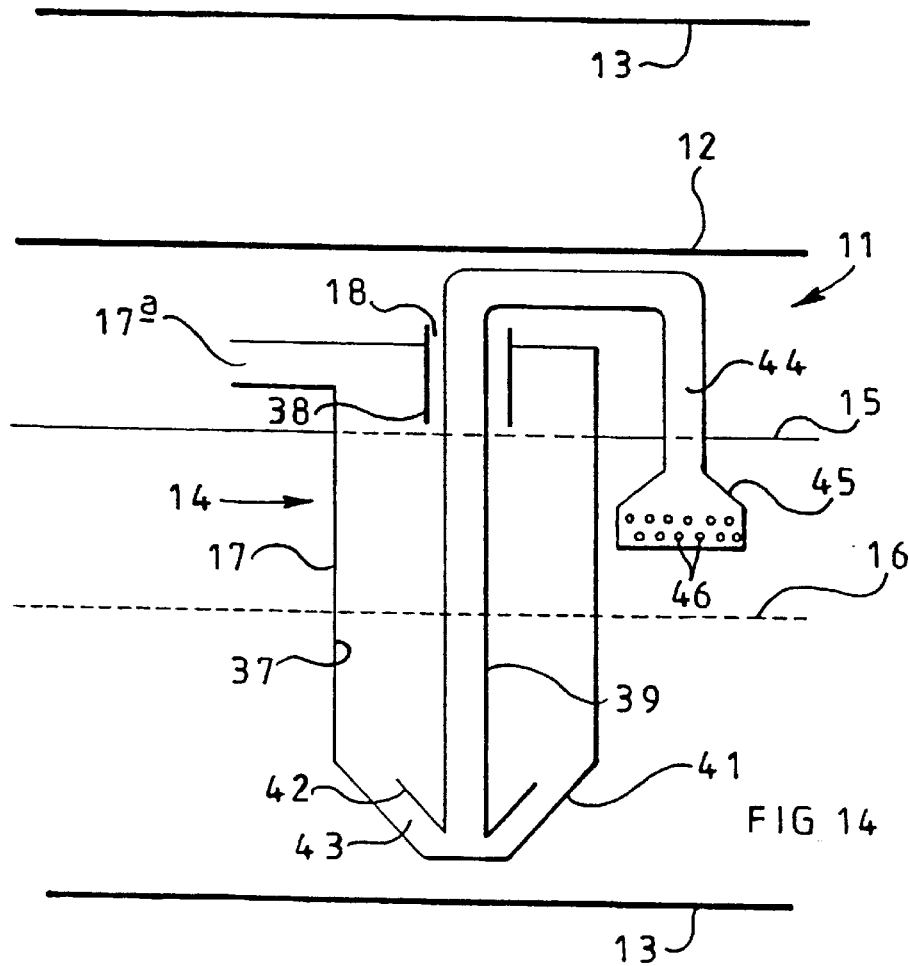
FIG. 14 is a view similar to FIG. 6 of a gravity separator in accordance with a fifth example of the present invention.

In the example of the invention illustrated in FIG. 14 the cyclone separator 17 includes a chamber 37 illustrated diagrammatically in FIG. 14 into which the gas/oil/water mixture is introduced tangentially in known manner firm the inlet 17a. At its upper end, a vortex finder 38 in the form of a tube of circular cross-section extends downwardly through the upper wall of the cyclone and into the chamber 37 thus defining the gas outlet 18 of the cyclone 17. A liquid outlet pipe 39 extends coaxially through the vortex finder 38 to the lower end of the chamber 37, the lower end of the chamber 37 being closed. In use, a cyclonic action develops within the chamber 37 as a result of the tangential inlet flow, and in known manner a gas core forms around the axis of the chamber 37, that is to say around the exterior of the pipe 39.

At its lower end of the housing of the cyclone 17 includes a frusto-conical region 41, and attached to the lower end of the pipe 39 within the region 41 is a gas blockage device 42. The device 42 is in the form of a frustum of a cone substantially parallel to the inner surface of the region 41 such that an annular passage 43 of reducing diameter is defined therebetween, the passage 43 being the route which liquid must take from the chamber 37 into the lower end of the pipe 39. The device 42 prevents the gas core reaching the open end of the pipe 39, and in effect provides an back pressure within the gas core such that gas flows from the core into the vortex finder 38, and thus discharges through the gas outlet 18 into the gas layer of the vessel 11. The device 42 ensures that the cyclone can accommodate a fairly wide range of variations of flow and inlet composition while ensuring that the gas core does not break through into the liquid underflow entering the lower end of the tube 39.

At its upper end the tube 39 includes a right-angle bend whereby the tube extends horizontally within the gas layer. Thereafter the tube is bent again through 90° to form a vertically downwardly extending region 44. The region 44 terminates in a discharge assembly 45 within the region of the vessel 11 occupied by the oil layer in use, the assembly being similar to the assembly 36 or being a vane assembly or the like. Thus the liquid underflow of the cyclone 17 passes through the pipe 39 and its region 44 into the device 45 where it percolates through a plurality of circumferentially disposed outlet apertures 46 into the oil layer in use.

In each of the embodiments described above the cyclone separator(s) 17 of the inlet assembly 14 is within the vessel 11 and the inlet mixture of the cyclone separator is piped though the wall of the vessel. It will be appreciated that if desired the cyclone separator(s) could be positioned externally of the vessel with the ducting which receives the underflow of the separator extending though the vessel wall to discharge the underflow into the oil layer region of the vessel. Clearly arrangements such as those shown in FIGS. 11 to 14 are more suited to such external positioning. The overflow gas phase can be piped from the cyclone separator overflow outlet into the gas layer region of the vessel or can be piped to join the gas outlet externally of the vessel 11.

The objective of the embodiments described above is to duct the underflow to the vessel above the water layer, desirably adjacent the gas/oil interface. Where the cyclone separator is positioned vertically within a vessel of normal dimensions the axial length of the cyclone separator is such that its overflow outlet will be above the gas/oil interface and the underflow outlet will be below the surface of the water layer, hence the need to duct the underflow upwardly. However in some instances it would be possible to have an unducted underflow outlet of a cyclone separator above the oil/water interface by inclining the cyclone axis out of the vertical within the vessel. The inclination could be such that the underflow is above the oil/water interface while the overflow remains above the oil/gas interface. A horizontally mounted cyclone could lie between the interfaces 15, 16 but would advantageously have ducting to conduct the gas overflow up into the gas layer to avoid it bubbling through the oil layer.

An inclined cyclone could be positioned transverse to the vessel 11, that is with its longitudinal axis lying in a plane normal to the longitudinal axis of the vessel 11 (the flow direction in a vessel of the kind shown in FIG. 2. Alternatively the cyclone separator could be inclined longitudinally within the vessel, that is with its longitudinal axis in a plane containing the longitudinal axis of the vessel, or a plane parallel thereto.

It will be understood that the objective of all of the foregoing embodiments is to discharge the cyclone separator underflow into the vessel 11 above the surface of the water layer and preferably into the oil layer. However as the dispersion layer (if one exists) will be at its deepest adjacent the inlet assembly 14, in many cases the underflow will be discharged into the vessel in the dispersion layer but at a level above the notional oil/water interface 16.

All of the above described embodiments could be utilised in a separation environment where no water is present and only gas and oil are to be separated, the underflow ducting or cyclone separator inclination being used to discharge the oil underflow of the inlet cyclone separator into the oil layer adjacent the oil/gas interface so the any micro-bubbles of gas coming out of solution in the discharged underflow have a minimum distance to travel though the oil layer.

It is recognised that in use the inlet flow to a gravity separator may vary in its composition such that the heights of the water/oil and oil/gas interfaces will be determined to some extent by the composition of the inlet mixture. In the examples of the invention shown in FIGS. 15 and 16 it can be seen that the gravity separator vessel 11 has a gas/liquid cyclone separator 17 forming part of its inlet assembly 14, and providing the route by which mixture enters the vessel 11. As described above the cyclone separator 17 separates the inlet mixture, generally the production flow from an oil well, into gas and liquid phases. The gas is discharged from the overflow outlet of the cyclone separator into the upper region of the vessel and the liquid phase, containing oil and water is discharged from the cyclone underflow outlet. Reference numerals 15 and 16 illustrate the notional positions of the gas/oil interface and the oil/water interface within the vessel, but of course it will be recognised that the actual positions of these interfaces will be determined to some extent by the composition of the inlet mixture. For example, a greater water cut (proportion of water to oil) will lift the interface 16 relative to the bottom wall of the vessel.

Figure 15:
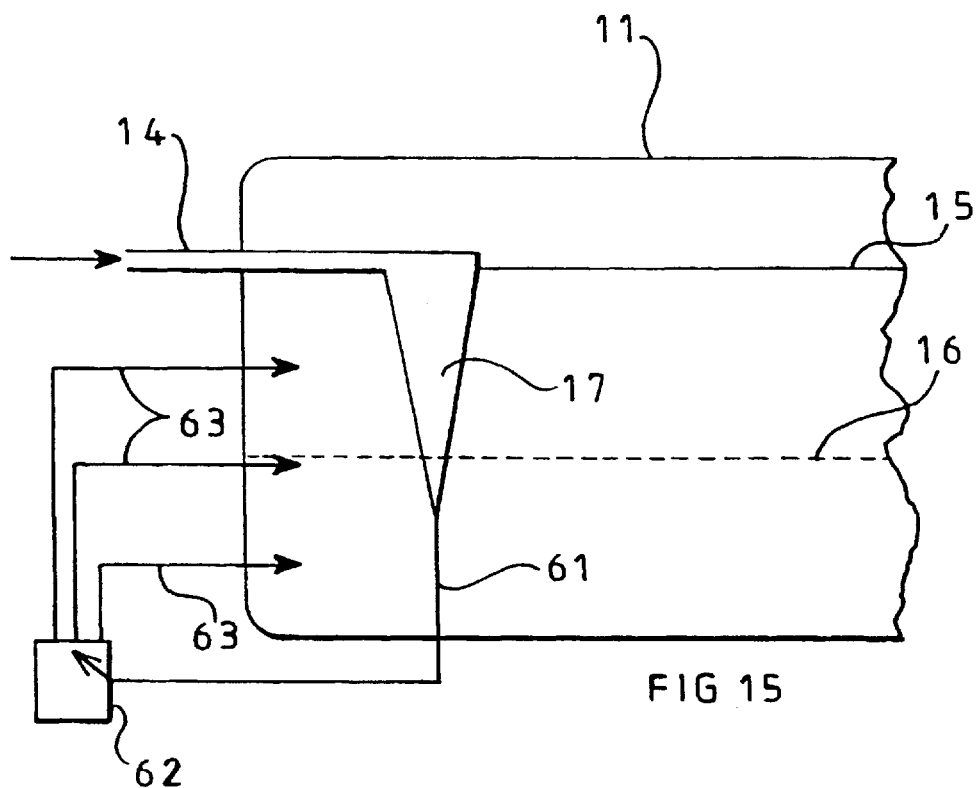
FIGS. 15 and 16 are similar diagrammatic views of two alternative ways in which the height within the vessel at which cyclone underflow discharge takes place can be adjusted.

FIG. 15 illustrates that the underflow outlet of the cyclone separator 17 is connected through a line 61 to a distribution valve 62 positioned externally of the vessel 11. The line 61 passes through the wall of the vessel 11 at any convenient point, and a plurality of return lines 63 (three being shown in FIG. 15 for convenience) provide alternative routes from the valve 62 back into the vessel 11 at different heights above the bottom of the vessel. The valve 62 can be set manually, or automatically, to determine which of the return lines 63 receives the liquid underflow of the cyclone 17 from the line 61. In the arrangement as drawn in FIG. 15 the uppermost line will receive the liquid underflow of the cyclone separator 17 in order that the liquid underflow is returned to the vessel 11 above the water layer in the vessel 11. However, in a situation where the water cut of the inlet mixture is lower then the middle, or bottom lines 63 may be chosen to accommodate the lower position of the interface 16.

The setting of the valve 62 could be controlled automatically by monitoring means sensitive to the position of the interface 16. However, in applications where it is unlikely that there will be sudden changes in the composition of the inlet mixture manual control of the valve 62 based upon analysis of the inlet mixture, or alternatively analysis of the performance of the gravity separator, will be appropriate. Moreover other forms of flow distribution other than valve 62 could be used. For example the valve 62 could be replaced by a flow divider which directs flow to each of the lines 63, each line 63 incorporating a respective valve the setting of which determines whether or not there is flow from that line into the vessel.

Figure 16:
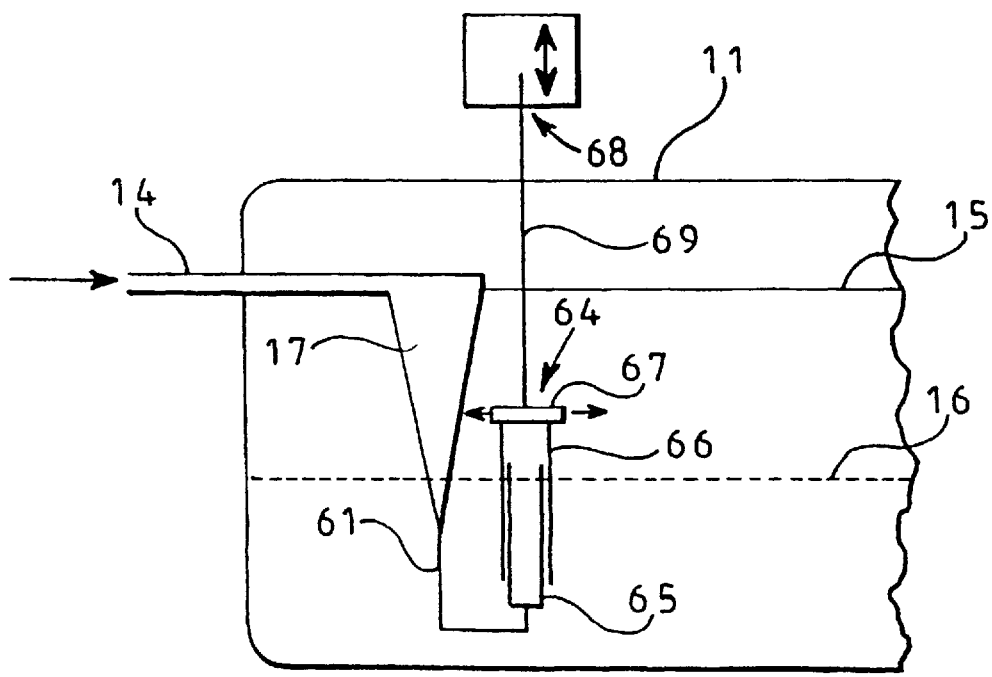

FIG. 16 illustrates an alternative adjustment concept in which the line 61 conducting the liquid underflow from the cyclone separator 17 enters a vertically adjustable outlet assembly 64 within the vessel 11. The assembly 64 includes a stationary pipe 65 communicating at its lower end with the line 61 and extending upwardly within the vessel. Coaxial with the pipe 65 and in a telescopic, sealing fit therewith is a movable pipe 66 having a discharge assembly 67 at its uppermost end. Liquid underflow from the cyclone separator 17 passes along the line 61 and into the pipe 65. The liquid flows through the pipe 65 and the pipe 66 to issue from the discharge assembly 67. The position of the discharge assembly 67, vertically within the vessel 11, can be adjusted by sliding the pipe 66 relative to the pipe 65. FIG. 16 illustrates diagrammatically a mechanism 68 whereby the adjustment of the position of the pipe 66 relative to the pipe 65 can be effected.

The mechanism 68 includes a link member 69 anchored at one end to the discharge assembly 67, and extending upwardly through the vessel 11 and through a sliding seal at the upper wall of the vessel 11. The upper end of the link member 69 is connected to a drive arrangement whereby the link member 69 may be moved in the direction of its length thus sliding the pipe 66 relative to the pipe 65 and adjusting the height of the discharge assembly 67. The mechanism 68 can be manually controlled, for example through the intermediary of some form of screw adjustment mechanism, or can be automatically controlled for example by an electrically driven rack and pinion arrangement the electric drive motor being controlled manually, or in accordance with monitoring means sensitive to the level of the interface 16 within the vessel 11.

In a further alternative construction the line 61 is a flexible line and carries the discharge assembly 67 at its end remote from the cyclone 17. Any convenient form of height adjustment mechanism can be provided for moving the assembly 67 to adjust the discharge height in the vessel. For example a mechanism similar to mechanism 68 could be used. However in an alternative the mechanism can utilize a float device sensitive to the height of the water layer for ensuring that notwithstanding changes in the height of the water/oil interface in the vessel, the assembly 67 is moved to discharge above the water layer. It will be understood that a similar float operated mechanism could be used in conjunction with the telescopic tube concept of FIG. 16 and that a float device could be used to control the valve 62 of FIG. 15.

It will be recognised that many of the constructional variants disclosed above in conjunction with FIGS. 6 to 14 can be used in conjunction with the adjustability concepts described above in relation to FIGS. 15 and 16.

Figure 17:
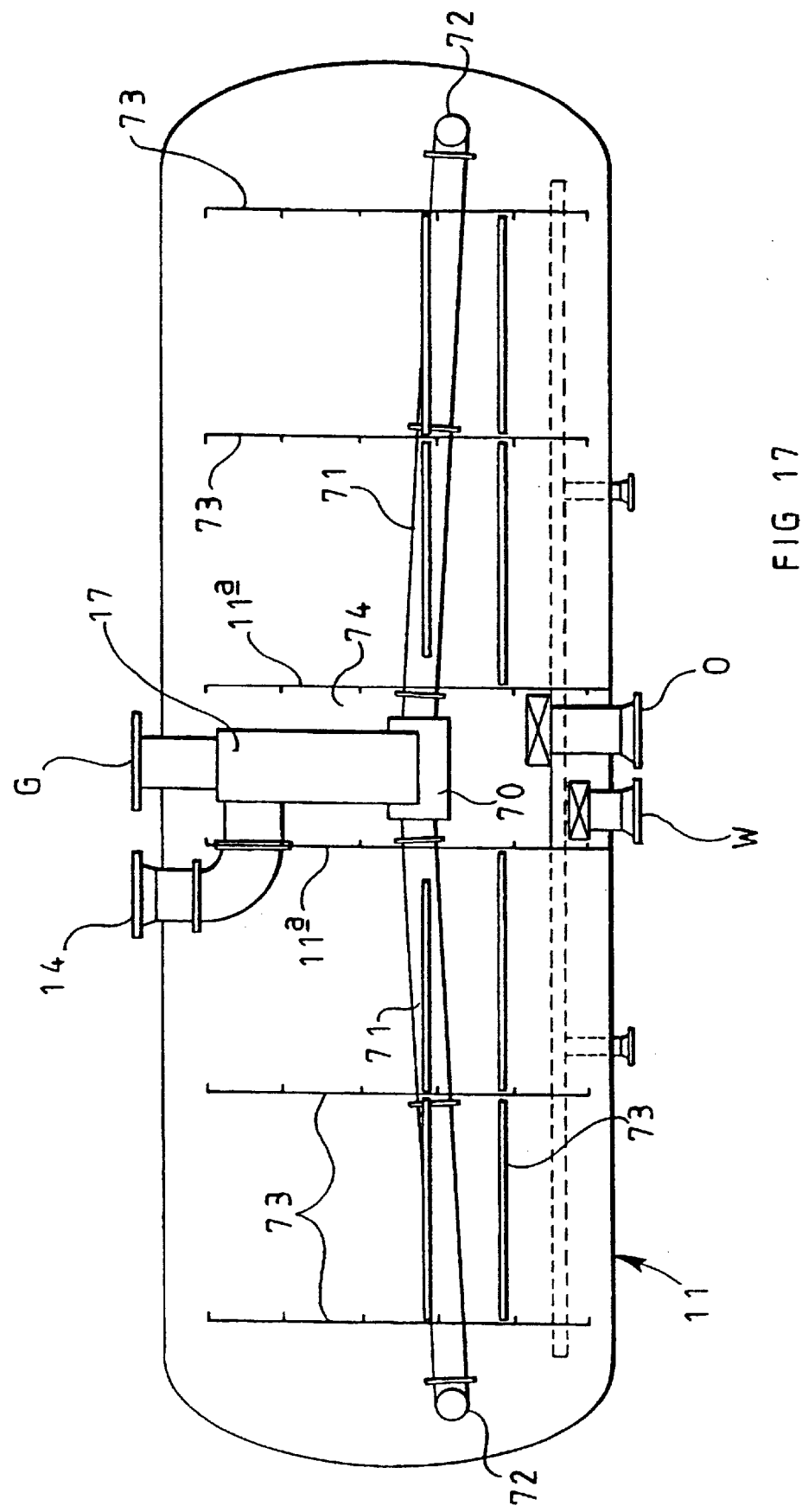
FIG. 17 is a view similar to FIG. 6 of a gravity separator in accordance with a sixth example of the present invention.

In the example of the invention illustrated in FIG. 17 the vessel 11 has a gas/liquid cyclone inlet assembly 14, 17 which is disposed generally midway along the length of the vessel, the underflow of the 17 being ducted by a distributor box 70 and pipes 71 to respective distributors 72 which are above the water layer in the vessel and adjacent the opposite axial ends of the vessel respectively. The vessel 11 has an oil outlet well 74 which is disposed generally midway along the length of the vessel and which fills from the vessel with separated oil in use by way of one or more weirs 11a in the wall of the well 74. The well 74 communicates with an oil outlet line "O" and disposed beneath the well 74 the vessel has a water outlet line "W". The vessel can be provided with a gas outlet if necessary, but it is intended that the gas content of the inlet mixture will be discharged outside the vessel by way of an outlet duct "G" communicating with the reject outlet of the cyclone 17. This is a variant which can be applied to any of the constructions described above should it be desired to minimise the formation of a gas layer in the vessel. However usually some gas will be evolved in the vessel and so some gas outlet arrangement will usually be provided adjacent the top of the vessel. The vessel can contain surge control baffles 73 in known manner.

In a further embodiment of the invention the diameter of the vessel 11 and the operating conditions which determine the height, in the vessel, of the oil/water interface, are so selected in relation to the positioning and axial length of the cyclone separator, that the cyclone separator which extends generally normal to the plane of the oil/water interface in use, has its underflow outlet positioned above the water layer, desirably in the oil layer, so as to be able to discharge directly into the vessel, preferably through an anti-swirl device.

What is claimed is:

1. A gravity separator comprising a vessel within which a mixture containing oil and water can separate under gravity to form vertically discrete oil, water and gas layers, the vessel having an inlet assembly including a cyclone separator for separating oil-containing inlet flow into gas and liquid phases, the gravity separator being characterized by including ducting for receiving the underflow of the cyclone separator and conducting said underflow into that region of the vessel which, in use, is below the gas layer and above the water layer.

2. A gravity separator as claimed in claim 1, wherein the cyclone separator is housed within said vessel.

3. A gravity separator as claimed in claim 2, wherein the cyclone separator has its overflow outlet within the region of said vessel occupied in use by the gas layer above said oil layer.

4. A gravity separator as claimed in claim 2, wherein the overflow outlet of the cyclone separator discharges externally of the vessel.

5. A gravity separator as claimed in claim 1, wherein said cyclone separator is positioned externally of said vessel, said ducting extending through the wall of said vessel to discharge the underflow into said region above the water layer.

6. A gravity separator comprising a vessel within which a mixture containing oil and water can separate under gravity to form vertically discrete oils water and gas layers, the vessel having an inlet assembly including a cyclone separator for separating an oil containing inlet flow into gas and liquid phases, said cyclone separator being positioned inside said vessel and the cyclone separator being positioned with its longitudinal axis inclined out of the vertical by an angle such that, in use, the underflow outlet of the cyclone separator lies below the region of the vessel occupied by the gas layer and above the region of said vessel occupied by said water layer.

7. A gravity separator as claimed in claim 6, wherein the angle of inclination of the cyclone axis is such, in relation to the length of the cyclone separator, that the overflow outlet of the separator lies in that region of the vessel occupied by the gas layer in use.

8. A gravity separator as claimed in claim 6, wherein said cyclone separator is arranged with its longitudinal axis in a plane normal to the longitudinal axis of said vessel.

9. A gravity separator as claimed in claim 6, wherein said cyclone separator is positioned with its longitudinal axis in a plane containing, or parallel to, the longitudinal axis of said vessel.

10. A gravity separator comprising a vessel within which a mixture containing water, oil and gas can separate under gravity to form vertically discrete water, oil and gas layers, the vessel having an inlet assembly including a cyclone separator for separating an inlet flow containing water, oil and gas into gas and liquid phases, and the assembly being arranged to discharge the underflow of the cyclone separator into that region of said vessel which is between the water and gas layers in use.

11. A gravity separator as claimed in claim 10, wherein there is provided ducting for receiving the underflow of the cyclone separator and conducting said underflow into said region of the vessel.

12. A gravity separator as claimed in claim 10, characterized in that said cyclone separator is positioned within said vessel with its longitudinal axis inclined out of the vertical by an angle such that the underflow outlet of the cyclone separator lies in said region of said vessel.

13. A gravity separator as claimed in claim 1, wherein the height within the vessel at which the underflow of the cyclone separator is discharged into the vessel can be adjusted.

14. A gravity separator as claimed in claim 1 wherein means is provided for dissipating swirl in the underflow prior to its discharge into the vessel.

15. A gravity separator as claimed in claim 1 wherein the inlet assembly includes a plurality of cyclone separators.

16. An inlet assembly for a gravity separator comprising a cyclone separator having a underflow outlet ducting arrangement for discharging the underflow at a region aligned with a position intermediate the axial ends of the cyclone separator.

17. A gravity separator comprising a vessel within which a mixture containing oil and water can separate under gravity to form vertically discrete oil, water and gas layers, the vessel having an inlet assembly including a cyclone separator for separating an oil containing inlet flow into gas, oil and water phases, wherein the selection of the vessel diameter and the height of the oil/water interface, in relation to the positioning and axial length of the cyclone separator, is such that with the cyclone separator positioned generally normal to the plane of the oil/water interface, the underflow outlet of the cyclone separator can discharge directly into that region of the vessel which, in use, is below the gas layer and above the water layer.

18. A gravity separator as claimed in claim 17, wherein said direct discharge of said underflow takes place by way of an anti-swirl device.

\* \* \* \* \*